March 3, 1970 H. L. NULL 3,498,302
CAR WASH SYSTEM
Filed Nov. 2, 1967 4 Sheets-Sheet 1

INVENTOR
H. L. Null
BY
Wofford & Felsman
ATTORNEYS

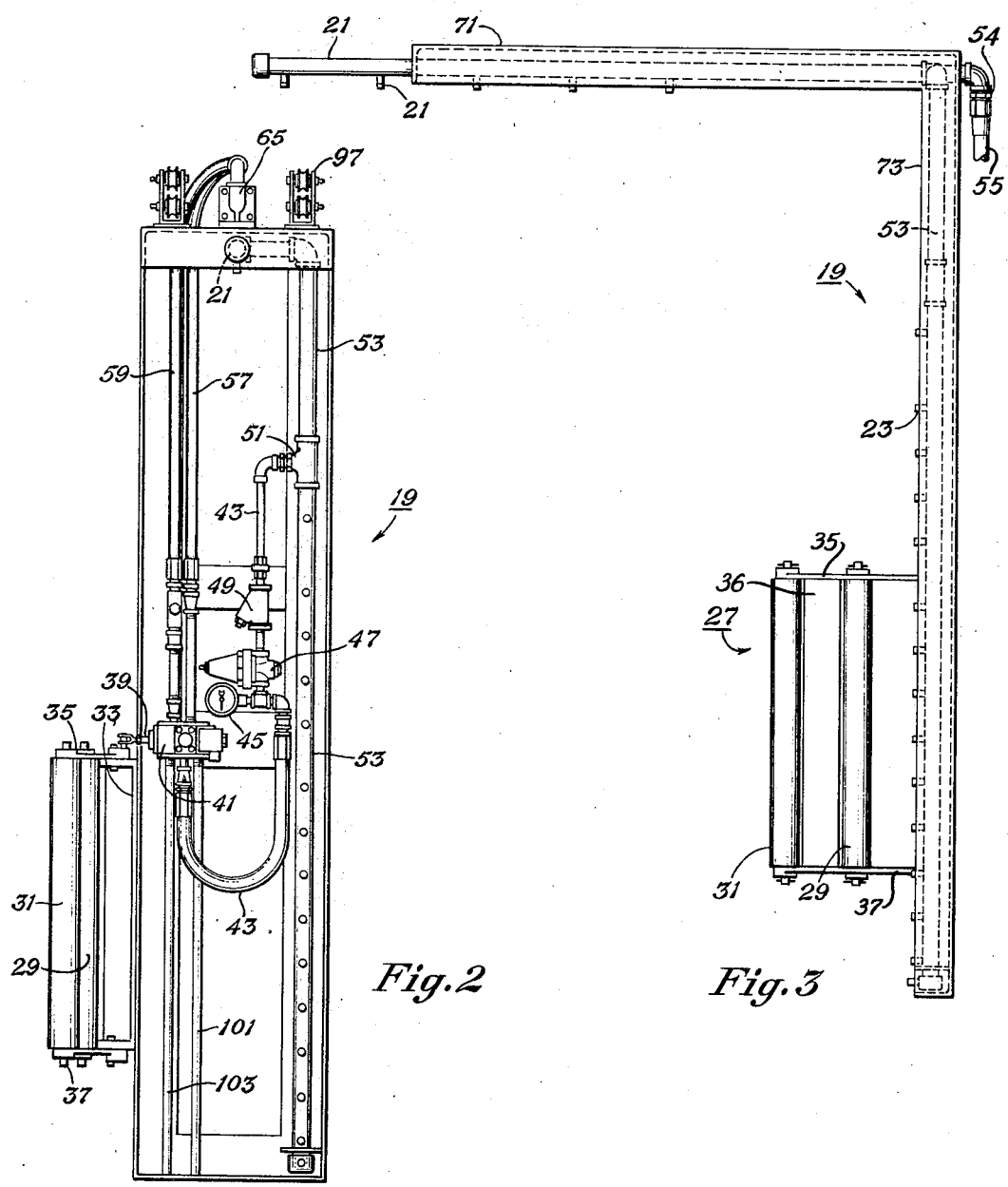

March 3, 1970     H. L. NULL     3,498,302
CAR WASH SYSTEM

Filed Nov. 2, 1967     4 Sheets-Sheet 3

INVENTOR
H. L. Null
BY Wofford & Felman
ATTORNEYS

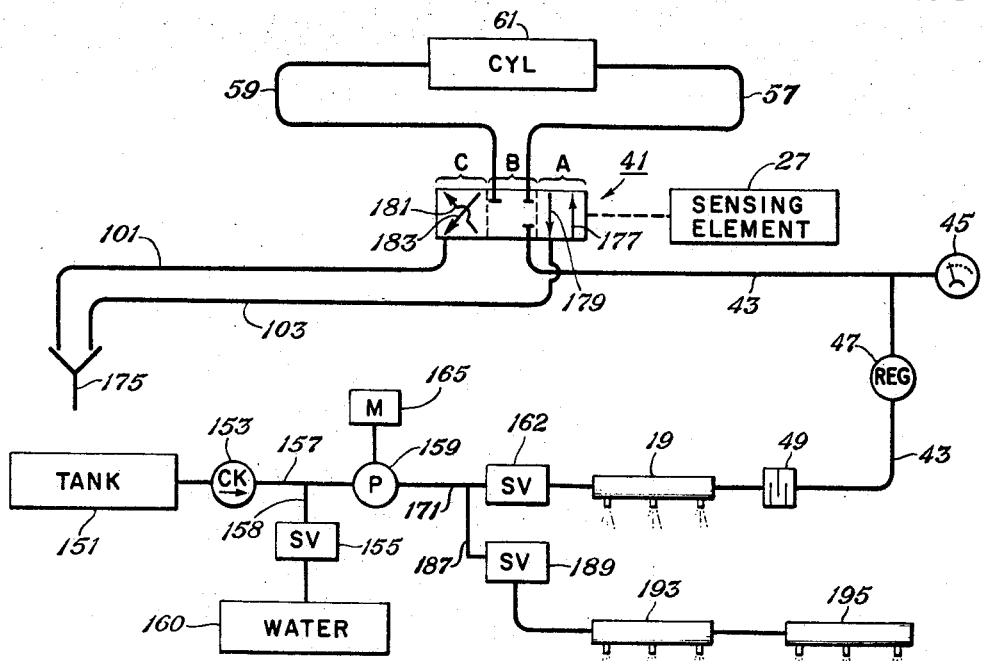
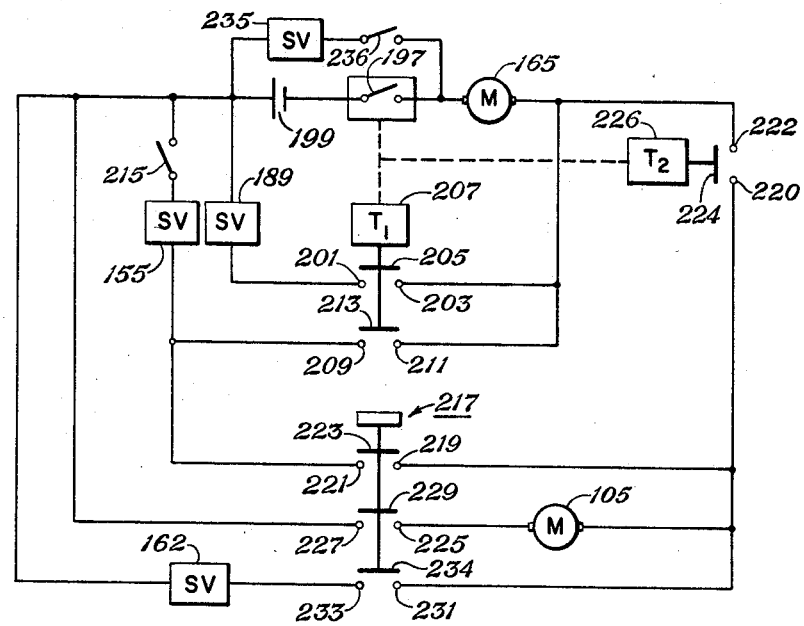
Fig. 7
Fig. 8

United States Patent Office 3,498,302
Patented Mar. 3, 1970

3,498,302
CAR WASH SYSTEM
H. L. Null, Haltom City, Tex., assignor of one-half to
Billy J. Graham, Fort Worth, Tex.
Filed Nov. 2, 1967, Ser. No. 680,211
Int. Cl. B60s 3/04; B08b 3/02
U.S. Cl. 134—45                                    11 Claims

ABSTRACT OF THE DISCLOSURE

A car wash system utilizing a generally overhead oval track upon which is mounted a movable trolley that supports a laterally reciprocating spray bar. The lateral position of the spray bar is determined by a sensing element secured to a spray bar assembly and actuated by engagement with a side or end surface of a vehicle being washed. The configuration of the sensing element minimizes the possibility of damage to either itself or the vehicle finish. Further, a wheel wash and pre-spray system is disclosed for use in combination with the overhead track system. Moreover, a control system that includes parallel timers is used to prevent interference with the wheel wash or pre-spray system by the overhead track system.

BACKGROUND AND GENERAL DISCUSSION

Previously known car wash systems include those having stationary spray bars, hand manipulated spray wands, and movable spray bars which orbit vehicles. The term "car" encompasses all vehicles which require washing, such as automobiles and trucks. Utilization of hand manipulated spray wands has the disadvantage that the user subjects himself to uncomfortable back-spray. The systems in which the users remain in their vehicles, referred to here as "automatic systems," have the disadvantage that the distance from spray nozzle to each vehicle varies according to the size of the vehicle. The velocity of water discharged from a nozzle decreases exponentially with the distance from the nozzle. The higher the velocity, the better the cleaning. However, it is uneconomical to use a large number of closed spaced nozzles that are extremely close to the vehicle, since this requires more equipment and greater quantities of car wash solution and rinse water. There is an optimum distance from nozzle to vehicle that enables the water stream to diverge sufficiently to impinge upon an economical area of the vehicle with a velocity great enough to adequately cleanse the area. With previously known systems, however, the lateral distance from the center of the system to the nozzles has been unalterably established during installation. As a consequence, the distance from vehicle to nozzles has varied due to the great variety of vehicle sizes, and cleansing has been less than completely satisfactory in many instances.

The most difficult portions of a vehicle to cleanse are the sides and end surfaces. The top of the vehicle does not generally become excessively dirty. Therefore, the problem of achieving the optimum distance from the nozzle to vehicle surface arises principally at the side and end surfaces of the vehicle. It accordingly is my purpose to provide an automatic car wash system in which the distance from the spray nozzle to the side and end surfaces of a vehicle is automatically maintained irrespective of the size of the vehicle.

To achieve the above purpose the nozzles must move longitudinally and laterally. The lateral position of the nozzles must be accurately maintained in a manner which will not damage the vehicle or car wash system components. It is therefore one of my purposes to provide a sensing element construction which positions the nozzles laterally relative to vehicle surfaces through utilization of a control system which has that degree of ruggedness characterized by fail safe reliability.

Moreover, it is my purpose to provide a mechanical biasing system which moves the sensing element and associated mechanism rearward from the vehicle when the control system used to establish the lateral position of the nozzles is de-energized.

In automatic car wash systems the utilization of brushes is considered disadvantageous in that foreign particles such as sand and grit become embedded in the brush bristles to the detriment of vehicle finishes. Accordingly, many car wash installation owners will not use systems that include brushes. Thus, I originated a wheel wash system which may be utilized in conjunction with the above discussed car wash system to effectively cleanse the tires and wheels of a vehicle without utilizing brushes. Also, I devised a pre-spray system which deposits a car wash solution on the vehicle prior to the introduction of the vehicle to the overhead track system to make dirt removal easier.

It is advantageous that the wheel wash and pre-spray system function in timed sequence relative to the operation of the remainder of the car wash system and, accordingly, I provided a system utilizing parallel timers that prevents interference with the wheel wash system by a vehicle leaving the overhead track system.

BRIEF DESCRIPTION OF THE FIGURES OF THE DRAWING

FIG. 2 is a side elevation view of a vertical spray bar assembly including a sensing element and related components utilized in establishing the lateral position of a spray bar; FIG. 3 is a front elevation view of the spray bar assembly shown in FIG. 2; FIG. 7 is a schematic diagram of a hydraulic circuit used to control the spray bar assembly lateral position, and fluid flow to the spray bar assembly and the wheel wash and pre-spray system; and FIG. 8 is a schematic diagram of an electrical circuit used to control the various electrically operated components of the system.

DESCRIPTION OF A PREFERRED EMBODIMENT

Figure 1:
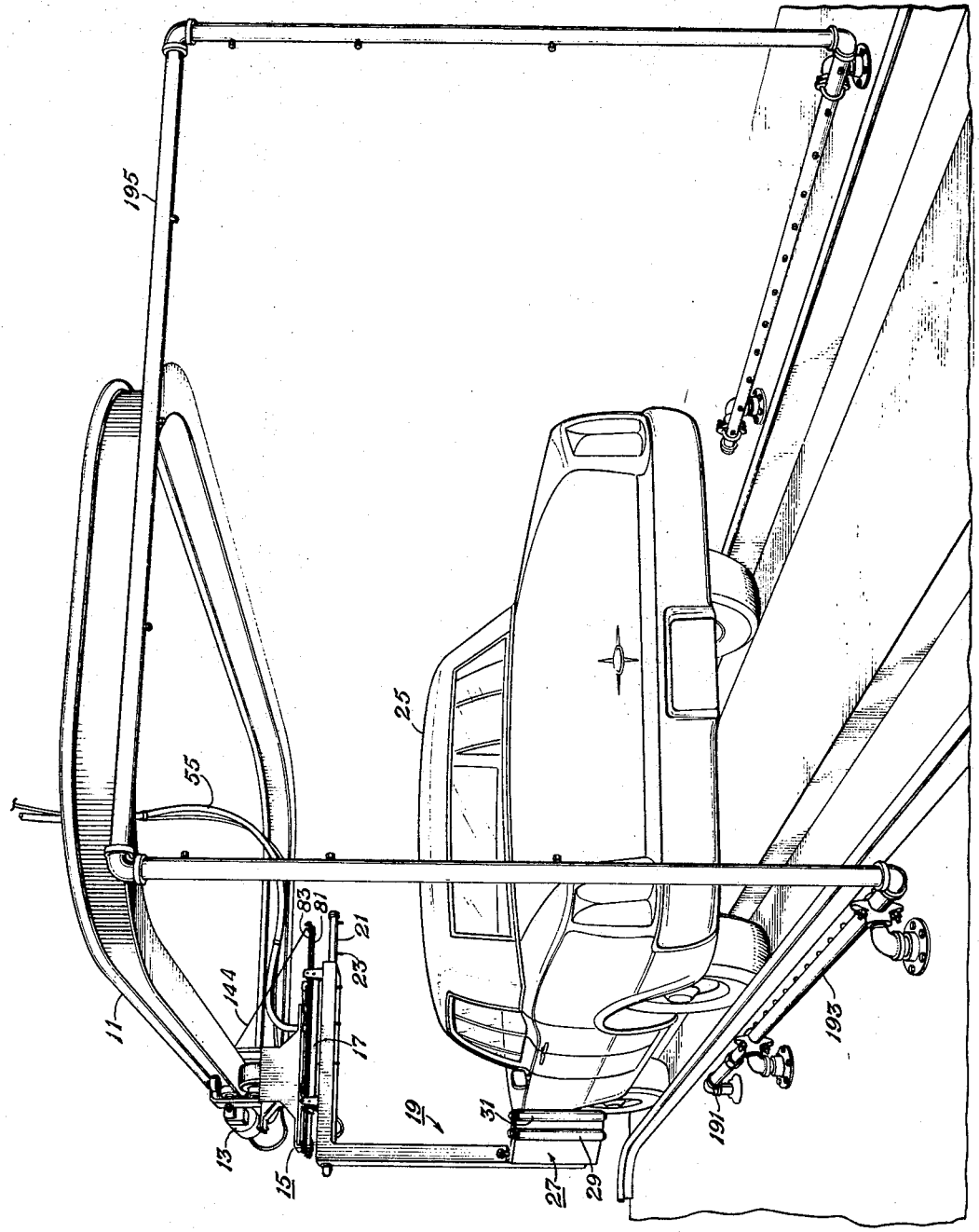
FIG. 1 is a perspective view illustrating an automatic car wash system embodying the principles of my invention.

Referring initially to FIG. 1 in the drawing, the numeral 11 designates an overhead, oval track which supports a trolley 13 adapted for movement around the track. A carriage 15 depends from the trolley and supports a reciprocable power means 17, which in this instance is a hydraulic cylinder used to reciprocate a vertical spray bar or wash element assembly 19 which includes horizontal spray bar or wash element 21. Each spray bar has a plurality of nozzles 23 spaced along the length thereof for discharging water on the exterior surface of vehicle 25.

Extending from the lower portion of the vertical spray bar assembly 19 is a sensing element 27 having in this instance two vertical rollers 29, 31. Details of the sensing element and spray bar assembly may be seen with reference to FIGS. 2 and 3 in which a bracket 33 (see FIG. 2) is shown supporting two vertically spaced but horizontally extending and pivotable arms 35, 37 used to support the rollers 29, 31. The exterior of the rollers is covered with a pliable material so as not to mar the finished surfaces of the vehicle 25. A reciprocating pin 39 is pivotally secured to arm 35 and functions as a control element for a three position valve 41 shown in FIG. 2. A rigid plate 36 (see FIG. 3) is secured to the arms between the rollers to partially cover and protect the rollers.

Fluid under pressure is introduced into the three position valve through a hydraulic line 43 which includes a pressure gage 45. A pressure regulator 47 and a "Y" strainer 49 are connected in series in the hydraulic line 43, which is secured to, as indicated by the numeral 51, a vertical spray bar 53 of the spray bar assembly. The vertical spray bar 53 is connected with the horizontal spray bar 21, and each spray bar has the previously mentioned plurality of nozzles 23. Fluid is fed into the horizontal and vertical spray bars through a connection 54 and flexible hydraulic line 55, as seen in FIG. 3.

Figure 4:
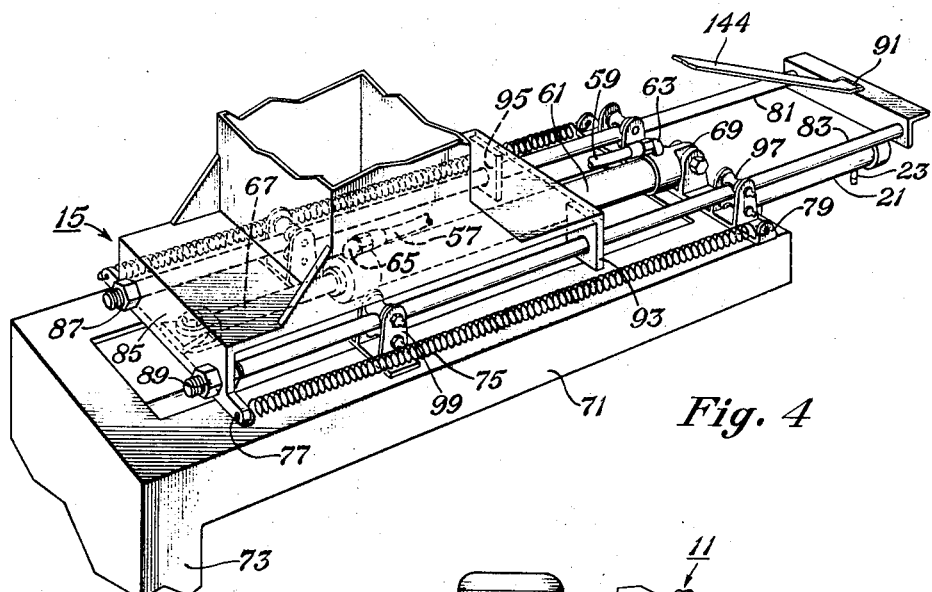
FIG. 4 is a fragmentary perspective view of the top portion of the spray bar assembly and a carriage connected with a trolley which travels around the overhead oval track shown in FIG. 1.

The three position valve 41 is connected with two conduits 57, 59 secured to opposite ends of a hydraulic cylinder 61 (see FIG. 4) as indicated by the numerals 63, 65 (see especially FIG. 4). The hydraulic cylinder 61 functions as a reciprocable power means used to transfer the spray bar assembly 19 to selected lateral locations relative to the adjacent surface of the vehicle 25. As shown in FIG. 4, the piston end 67 of the hydraulic cylinder is connected with a carriage 15, which extends downward from the trolley 13 as shown in FIG. 1. The housing of the hydraulic cylinder 61 is connected as indicated by the numeral 69 to a housing 71 which encloses the horizontal spray bar 21. Expansion or retraction of the hydraulic cylinder moves laterally housing 71, the horizontal spray bar it encloses, housing 73 and its enclosed vertical spray bar 53 relative to the trolley 13 and the overhead oval track 11.

A mechanical biasing element such as the springs 75 each have one end 77 connected with the carriage 15 and the opposite end 79 connected with the housing 71. Thus the mechanical biasing elements 75 urge the spray bar assembly 19 and sensing element 27 away from the vehicle 25. The carriage includes two support rods 81, 83 connected to a vertical wall 85 of the carriage as indicated by the numeral 87, 89. The opposite ends of the rods are connected with a spacer 91 (see FIG. 4), and the approximate mid-section held by vertical tabs 93, 95 which extend from the carriage. The bars 81, 83 are each supported between a pair of vertically stacked rollers 97, 99 as shown in FIG. 4 to provide relatively frictionless movement of the spray bar assembly relative to the carriage 15. As seen in FIG. 2, two discharge lines 101, 103 extend downward from the three position valve 41 to dump water onto the floor leading to a conventional drain (not shown).

Figure 5:
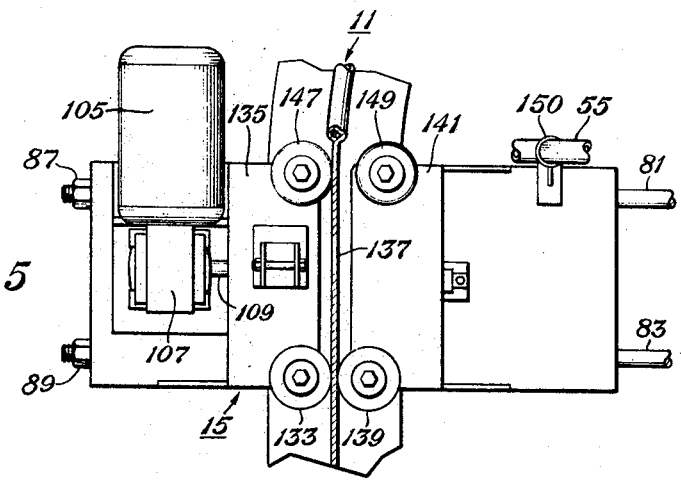
FIG. 5 is a plan view of the overhead trolley shown in FIG. 1.
Figure 6:
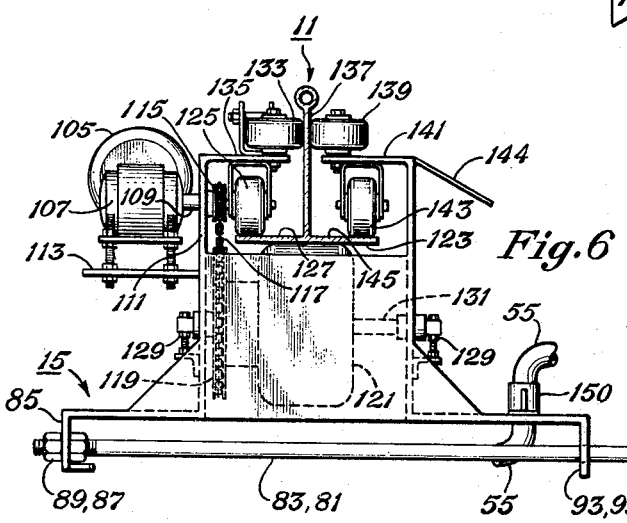
FIG. 6 is a front elevation view of the trolley shown in FIGS. 1 and 5.

Details of the trolley components may be seen in FIGS. 5 and 6 where the numeral 105 designates an electric motor connected with a gear reduction unit 107 having a shaft 109 protruding through a vertical wall 111 of the carriage 15. The motor 105 and gear reduction unit 107 are supported by a horizontally extending plate 113 as shown in FIG. 6. The shaft 109 supports a sprocket 115 which receives a chain 117 connected with another sprocket 119 which drives a large preferably rubber covered wheel 121 that rolls against the under surface 123 of the overhead oval track 11. Further, preferably aluminum wheel 125 engages an upward facing surface 127 on the overhead track. The vertical spacing of the large wheel 121 is controlled by adjustment means 129, which here are in the form of two threaded and axially movable fasteners secured to each end of a support shaft 131.

An idler wheel 133 is secured by suitable means to a horizontal plate 135 to engage a vertical wall 137 of the overhead track 11. A second idler wheel 139 engages the vertical wall 137 opposite the other idler wheel 133, being supported by horizontal plate 141 which also supports a vertically oriented idler wheel 143 that engages another upwardly facing surface 145 of the overhead track 11. An oblique support bar 144 extends from plate 141 (see FIG. 6) to spacer 91 (see FIG. 4). As shown in FIG. 5, the idler wheels 133, 139 are located toward one edge of carriage 15, and additional idler wheels 147, 149 are located toward the opposite edge of the carriage to provide operational stability. The idler wheel 149 is removed from the vertical wall 137 of the overhead track by an inch or so to enable movement past the rounded portions of the oval track. The flexible hydraulic line 55 is carried by suitable ring support 150 and, as previously explained and shown in FIG. 3, is connected as indicated by numeral 54 with the horizontal and vertical spray bars 21 and 53.

The sensing element 27 alters the position of the reciprocating pin 39, as described in connection with FIGS. 2 and 3, to alter the position of a control element (not shown) in three position valve 41. The mechanics of the automatic positioning of the spray bar assembly 19 relative to vehicle 25 may be understood with reference to FIG. 7, where it may be seen that the three position valve has three positions. One position A directs fluid into the cylinder to extend it; position B blocks the flow of fluid into the cylinder; and position C urges fluid into the cylinder to retract it. The three position valve 41 is connected in series with a wash solution tank 151 having a check valve 153 disposed in the conduit 157 (sometimes referred to as the first conduit) which serves as the discharge line of the tank 151 and the inlet of a pump 159. A rinse water solenoid valve 155 is connected with conduit 157 between check valve 153 and pump 159 by means of a conduit 158 (sometimes called the second conduit) leading to a rinse water source 160 preferably under about sixty p.s.i. pressure, as are many municipal water systems.

The pump 159 is driven by electric motor 165 and is connected in series with a spray bar assembly solenoid valve 162, the movable spray bar assembly 19, with the "Y" strainer 49, and with the regualtor 47 through a conduit 43 which leads to the three position valve. Preferably, pressure gage 45 is provided so that the pressure in conduit 43 may be periodically monitored. A discharge conduit 101 extends from the three position valve to a drain 175 as shown.

With the three position valve located in position A, fluid flows from the pump 159 through conduit 43 and its previously described components, through port 177 in the valve, and into the hydraulic cylinder 61 through hydraulic line 59. Simultaneously, fluid is discharged from the opposite side of the cylinder through hydraulic line 57, through port 179 of the valve, and through conduit 103 to the drain 175. With the three position valve in position B, fluid flow into cylinder 61 is blocked. With the hydraulic valve in position C fluid flows from pump 159 through the conduit 171, through port 181 of the valve, and into one end of the hydraulic cylinder 61 through hydraulic line 57. Simultaneously, fluid is discharged from the other end of the hydraulic cylinder through hydraulic line 59, through port 183 of the valve, to the conduit 101 and to drain 175. Hence, the hydraulic cylinder may be extended or retracted responsive to the disposition of the control element of the three position valve in positions A, B, or C. Such positions are established by sensing element 27 through engagement with the side or end surfaces of vehicle 25.

As also seen in FIG. 7, a conduit 187 having disposed therein a tire wash solenoid valve 189 extends to a prespray bar 195 and wheel wash spray bar 193.

A schematic electrical circuit used to control the solenoid valves in FIG. 7 and of other electrical components of my car wash system is shown in FIG. 8. A coin operated switch 197 is connected in series with a power source 199, with electric motor 165, with wheel wash solenoid valve 189, and with a pair of normally opened contacts 201, 203 of a switch 205 closed by timer 207 upon deposit of proper coinage in coin switch 197. Simultaneously, contacts 209 and 211 are connected by a switch 213, which is also operated by a timer 207 upon deposit of the proper coinage in the switch 197. Contacts 209, 211, rinse water solenoid valve 155 and a switch 215 are connected across the coin operated switch 197, electric motor 165, and power source 199 as shown. Switch 215, which is located on the overhead track, is closed by the trolley after it travels one complete revolution.

A wheel bump switch 217 has three sets of contacts, one set of which being designated by the numerals 219, 221 and being adapted for connection by a switch element 223. Contacts 219, 221 are connected in series with contacts 220, 222 adapted to be closed with a switch element 224 actuated by a noninterference timer 226 which is actuated by coin operated switch 197. In addition, the contacts 219, 221 of the wheel bump switch 217 and contacts 220, 222 of the noninterference timer 226 are connected in parallel with contacts 209, 211 of timer 207 across power source 199, coin switch 197, overhead track switch 215, and rinse water solenoid valve 155.

The electric motor 105 which drives trolley 13 is connected in series with a second set of contacts 225, 227 adapted to be closed by a switch element 229 of the wheel bump switch 217. The motor 105 and contacts 225, 227 are connected across the power source 199, coin operated switch 197, and noninterference timer 226, and contacts 220, 222 as shown.

Further, a spray bar assembly solenoid 162 and a third set of contacts 231, 233, adapted to be closed with a switch element 234, are connected in parallel with motor 105 and contacts 225, 227 across the power source 199, coin operated switch 197 and noninterference timer as shown.

In operation, the vehicle 25 is driven forward to a position where coinage may be deposited in coin operated switch 197 (see FIG. 8). The deposit of the coinage activates the primary timer 207 and connects the contacts 201 and 203 through switch 205 and contacts 209, 211 through switch 213. A circuit is thus closed to energize the primary motor 165 and open tire wash and pre-spray solenoid valve 189. Hence fluid flows from pump 159 (see FIG. 7) through conduit 187, through open tire wash and pre-spray solenoid valve 189 to the tire wash spray bar 193 and to the generally U-shaped pre-spray bar 195. Consequently, wash solution from tank 151 cleans the tires and wheels and simultaneously deposits car wash solution on the vehicle 25. The primary timer 207 (see FIG. 8) keeps switches 205 and 213 depressed for a selected amount of time, as for example forty-five seconds. This will enable the vehicle to be driven slowly through the spray emitted from the nozzles of the wheel wash spray bar 193 and pre-spray bar 195.

The depression of switch 213 connects contacts 209, 211 in the circuit containing a rinse water solenoid valve 155 and the overhead track switch 215. The vehicle 25 may be moved forward until a front tire depresses a wheel bump switch 217 to urge the switch elements 223, 229 and 234 to positions to connect the contacts 221, 229; 227, 225; and 233, 231. Deposit of the proper coinage in the coin operated switch 197 also activates a noninterference timer 226 which closes contacts 220, 222 after the passage of a selected period of time, as for example twenty seconds after coin deposit.

Therefore, depression of the wheel bump switch 217 energizes the solenoid valve 162 to introduce fluid under pressure into the spray bar assembly 19 (see FIG. 7). Depression of the wheel bump switch 217 also energizes the trolley motor 105 which drives the wheel 121 (see FIG. 6) to orbit the spray bar assembly around the vehicle 25. Also, depression of the wheel bump switch 217 enables the rinse water solenoid valve 155 to be energized after the depression of an overhead track switch 215, which is actuated after the spray assembly has circled the car one time. After one complete revolution of the spray bar assembly 19, the overhead track switch 215 is depressed to energize the rinse water solenoid valve 155 which introduces into conduit 157 (see FIG. 7) water under pressure from source 160. The increased pressure on conduit 157, acting against check valve 153, closes the check valve and prevents wash solution from entering the system from tank 151. Consequently, during the second revolution of the spray bar assembly 19 around the vehicle 25, rinse water is deposited on the vehicle to rinse away the car wash solution deposited during the first revolution.

It may be noted with reference to FIG. 8 that for an initial selected period of for example twenty seconds, the switch 224 of the noninterference timer 226 does not connect the contacts 220, 222 and thus irrespective of the depression of the wheel bump switch 217, neither the spray bar assembly solenoid 162, the trolley motor 105, or the rinse water solenoid valve 155 may be energized (the latter can be energized only when overhead trolley switch is depressed after one revolution of the trolley through energization of trolley motor 105). This enables the driver of a second vehicle to deposit a coin in the coin operated switch 197 and receive tire wash and pre-spray treatment while the first vehicle 25 is being cleansed by the spray bar assembly. So long as the first automobile leaves the car wash system after completion of spray bar assembly activity and within the selected period that the noninterference timer 226 keeps switch 224 open, there can be no activation of the various components of the spray bar assembly and trolley system even though the first vehicle 25 depresses the wheel bump switch 217 with its rear wheel when departing.

When vehicle 25 depresses the wheel bump switch 217 to connect the previously mentioned three sets of contacts, fluid flows from pump 159, through the spray bar 19, Y strainer 49, and regulator 47 into the three position valve 41. The three position valve is normally biased by springs or otherwise toward position A such that fluid flows into the hydraulic cylinder 61 to extend it and thus urge the sensing element 27 toward the side surface of the vehicle 25. When the sensing element touches the side surface, it moves the reciprocating pin 39 (see FIG. 2) to urge the three position valve to the blocked position B and, upon continued movement of the pin 39, toward the position C which as previously explained retracts the hydraulic cylinder to urge the sensing element 27 away from the side surface of the vehicle 25. Thus, the lateral location of the spray bar assembly 19 is controlled by the sensing element 27 which is urged toward the vehicle until the sensing element urges the three position valve 41 to a position to reverse flow through the hydraulic cylinder 61 and retract the sensing element.

The simultaneous activation of the trolley motor 105 by depression of the wheel bump switch 217 rotates the spray bar assembly around vehicle 25 and opens the spray bar solenoid valve 162 to discharge car wash solution on the vehicle. After making one complete revolution, the overhead track switch 215 is actuated by the trolley 13 to open the rinse water solenoid valve 155 while closing the check valve 153 as previously explained to rinse the car wash solution from the vehicle. After trolley 13 completes a second revolution, a switch 236 is depressed to energize a solenoid valve 235 which urges the three position valve 41 to a position to retract the sensing element and stop trolley motor 105 in preparation for the next cycle.

While I have shown my invention in only one of its forms it should be apparent to those skilled in the art that it is not so limited but is susceptible to various changes and modifications without departing from the spirit thereof. Many of the hydraulic components have electrical equivalents and conversely many of the electrical components have hydraulic equivalents which may be substituted for each other. In addition, the specific form of components and their arrangement in the various circuits and systems may be varied within the broad scope of my invention.

What is claimed is:

1. A car wash system comprising:
   an oval track;
   a trolley secured to and powered for movement around said track;
   a carriage mounted to said trolley in transverse relation to said track;
   a vertical spray bar reciprocably mounted on said carriage;
   pump means connected with said vertical spray bar;
   hydraulically operable reciprocable power means communicating between said carriage and said spray bar;
   a sensing element secured to said spray bar;
   a three position valve coupled to said sensing element and actuated by same, said valve connected in a hydraulic line between said spray bar and said hydraulically operable reciprocable power means for establishing the lateral positions of said spray bar.

2. The system defined by claim 1 wherein said three position valve is mechanically connected with said sensing element; and said power means is a hydraulic cylinder powered for extension and retraction responsive to position changes of the sensing element and valve.

3. The system defined by claim 1 which further comprises a horizontal tire wash spray bar located on each side of a car track leading towad said overhead track; said pump means connected hydraulically with said horizontal spray bar.

4. The system defined by claim 1 which further comprises a pre-spray bar adjacent said track; said pump means connected hydraulically with said pre-spray bar.

5. The system defined by claim 1 which further comprises a horizontal spray bar located on each side of a car track leading toward said overhead track; a pre-spray bar extending at least partially over said car track; said pump means connected hydraulically with said pre-spray bar.

6. A car wash system comprising:
   an oval track;
   a trolley secured to and powered for movement around said track;
   a carriage mounted to said trolley in transverse relation to said track;
   a vertical spray bar reciprocably mounted on said carriage;
   a biasing means connected between said carriage and said spray bar to urge the spray bar outward relative to the overhead oval track;
   pump means connected with said vertical spray bar;
   reciprocable power means communicating between said carriage and said spray bar;
   a sensing element secured to said spray bar; and
   circuit means communicating between said sensing element and said power means to energize and deenergize said power means responsive to signals from said sensing element for establishing the lateral positions of said spray bar.

7. The system defined by claim 6 wherein a valve is connected with said sensing element; said circuit means is a hydraulic circuit which includes said valve; and said power means is a hydraulic cylinder powered for extension and retraction responsive to position changes of the sensing element and valve.

8. The system defined by claim 6 in which said sensing element comprises a bracket that includes two vertically spaced and horizontally extending arms; two vertical rollers spaced along the length of said arms, one being positioned at the extremity thereof; and a rigid plate secured to said arms to partially cover and protect said rollers.

9. A car wash system comprising:
   a pump;
   a wash solution tank connected by a first conduit with said pump;
   a spray bar assembly carried by an oval track for movement around the vehicle and connected hydraulically with said pump;
   a switch adjacent said oval track;
   a coin operated switch to energize said pump;
   a pre-spray bar connected with said pump;
   a valve connected with said coin operated switch and said spray bar assembly and opened upon activation of said coin operated switch;
   a second valve connected by a second conduit with said first conduit and with said coin operated switch and activated by the switch adjacent said oval track;
   a rinse water source connected with said second valve; and
   a check valve disposed in said first conduit between said tank and said second valve to close the check valve and transmit only rinse water to the pump when said second valve is opened.

10. In a car wash system having an oval track, vertical spray bar mounted on a trolley to travel around said track, pump means for supplying fluid to said spray bar, and a horizontal tire wash spray bar also connected with said pump means, the combination of:
    a motor in a circuit including a power source to drive the pump means associated with said tire wash spray bar;
    a coin meter switch in said circuit actuated by coin deposit;
    a primary timer and normally opened switch communicating with and energized by said coin meter switch;
    a noninterference timer and normally closed switch connected in parallel with said primary timer and switch;
    a car actuated switch connected in series with said noninterference timer;
    a power source for driving the trolley connected in series with said noninterference timer and switch and said car actuated switch; and
    said primary timer and switch opening after a selected time interval, and said noninterference timer and switch closing after a selected shorter interval of time.

11. A car wash system comprising:
    an oval track;
    a trolley secured to and powered for movement around said track;
    a carriage mounted to said trolley in transverse relation to said track;
    a vertical spray bar reciprocably mounted on said carriage;
    pump means connected with said vertical spray bar;
    reciprocable power means communicating between said carriage and said spray bar;
    a sensing element secured to said spray bar;
    circuit means communicating between said sensing element and said power means to energize and deenergize said power means responsive to signals from said sensing element for establishing the lateral positions of said spray bar;
    said sensing element comprising a bracket that includes two vertically spaced and horizontally extending arms; two vertical rollers spaced along the length of said arms, one being positioned at the extremity thereof; and a rigid plate secured to said arms to partially cover and protect said rollers.

(References on following page)

References Cited

UNITED STATES PATENTS

| | | | |
|---|---|---|---|
| 2,904,894 | 9/1959 | Hurst | 118—8 XR |
| 3,167,797 | 2/1965 | Hergonson | 134—123 XR |
| 3,315,691 | 4/1967 | Widner | 134—57 |
| 3,398,755 | 8/1968 | Hudson et al. | 134—123 XR |

FOREIGN PATENTS

| | | |
|---|---|---|
| 1,464,763 | 11/1966 | France. |
| 627,777 | 11/1961 | Italy. |

DANIEL BLUM, Primary Examiner

U.S. Cl. X.R.

134—57